(12) United States Patent
Gjerdevik et al.

(10) Patent No.: US 12,365,543 B2
(45) Date of Patent: Jul. 22, 2025

(54) AUTOMATED STORAGE AND RETRIEVAL SYSTEM COMPRISING A BARRIER

(71) Applicant: Autostore Technology AS, Nedre Vats (NO)

(72) Inventors: Øystein Gjerdevik, Skjold (NO); Ole Alexander Mæhle, Etne (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 771 days.

(21) Appl. No.: 17/623,206

(22) PCT Filed: Mar. 26, 2020

(86) PCT No.: PCT/EP2020/058592
§ 371 (c)(1),
(2) Date: Dec. 27, 2021

(87) PCT Pub. No.: WO2020/259883
PCT Pub. Date: Dec. 30, 2020

(65) Prior Publication Data
US 2022/0363477 A1    Nov. 17, 2022

(30) Foreign Application Priority Data
Jun. 28, 2019  (NO) .................................. 20190813

(51) Int. Cl.
*B65G 1/04*      (2006.01)
*B65G 1/137*     (2006.01)
(Continued)

(52) U.S. Cl.
CPC ......... *B65G 1/1375* (2013.01); *B65G 1/0492* (2013.01); *F16P 3/08* (2013.01);
(Continued)

(58) Field of Classification Search
CPC ...... B61B 13/02; G06K 7/10336; B65G 1/04; B65G 1/0478; B65G 1/0464;
(Continued)

(56) References Cited

U.S. PATENT DOCUMENTS 7,127,931 B1    10/2006   Borders
10,836,577 B2 * 11/2020   Fryer .................. B65G 1/02
(Continued)

FOREIGN PATENT DOCUMENTS

CN    202414603 U    9/2012
CN    103382754 A    11/2013
(Continued)

OTHER PUBLICATIONS

International Search Report issued in PCT/EP2020/058592, mailed on Jun. 22, 2020 (5 pages).
(Continued)

*Primary Examiner* — Patrick H Mackey
(74) *Attorney, Agent, or Firm* — Baker Botts L.L.P.

(57) ABSTRACT

An automated storage and retrieval system includes a three-dimensional storage grid for storing storage containers; first and second container handling vehicles operating on the storage grid; and a central communication system for controlling and communicating with the container handling vehicles for handling storage containers in the storage grid. The automated storage and retrieval system includes a barrier separating the three dimensional storage grid into a first section and a second section. The barrier has two states: a first state in which the container handling vehicles are allowed to move between the first section and the second section; and a second state, in which the container handling vehicles are physically prevented from moving between the first section and the second section by means of the barrier.

12 Claims, 10 Drawing Sheets

(51) Int. Cl.
*F16P 3/08* (2006.01)
*H04B 10/116* (2013.01)

(52) U.S. Cl.
CPC .......... *H04B 10/116* (2013.01); *B65G 1/0464* (2013.01); *B65G 2207/40* (2013.01)

(58) Field of Classification Search
CPC .... B65G 1/1375; B65G 1/0492; B65G 1/065; F16P 3/08; H04B 10/116; H04B 10/114; H04B 10/1149; H04B 10/00; H04W 72/142; H04W 72/20
See application file for complete search history.

(56) References Cited

U.S. PATENT DOCUMENTS

| | | | | |
|---|---|---|---|---|
| 10,882,540 | B2* | 1/2021 | Stadie | B08B 3/02 |
| 11,560,272 | B2* | 1/2023 | Ingram-Tedd | B65G 1/065 |
| 11,939,157 | B2* | 3/2024 | Lindbo | G06Q 10/087 |
| 2001/0038784 | A1 | 11/2001 | Peltomaki | |
| 2012/0185080 | A1 | 7/2012 | Cyrulik et al. | |
| 2017/0190516 | A1 | 7/2017 | Cyrulik et al. | |
| 2018/0044110 | A1* | 2/2018 | Clarke | A62C 2/247 |
| 2018/0148259 | A1 | 5/2018 | Gravelle et al. | |
| 2018/0181104 | A1 | 6/2018 | Stubbs et al. | |
| 2018/0194571 | A1 | 7/2018 | Fryer et al. | |
| 2019/0092568 | A1 | 3/2019 | Ingram-Tedd et al. | |
| 2019/0176323 | A1 | 6/2019 | Coady et al. | |

FOREIGN PATENT DOCUMENTS

| | | |
|---|---|---|
| CN | 103442998 A | 12/2013 |
| CN | 209025011 U | 6/2019 |
| JP | 2017509564 A | 4/2017 |
| WO | 317366 B1 | 10/2004 |
| WO | 2012/083055 A1 | 6/2012 |
| WO | 2014/075937 A1 | 5/2014 |
| WO | 2014/090684 A1 | 6/2014 |
| WO | 2015/140216 A1 | 9/2015 |
| WO | 2015/193278 A1 | 12/2015 |
| WO | 2016/033233 A1 | 3/2016 |
| WO | 2018/146304 A1 | 8/2018 |
| WO | 2019/001816 A1 | 1/2019 |
| WO | 2019/118235 A1 | 6/2019 |

OTHER PUBLICATIONS

Written Opinion of the International Searching Authority issued in PCT/EP2020/058592, mailed on Jun. 22, 2020 (9 pages).
Office Action issued in counterpart Chinese Patent Application No. 2020800470509 mailed on Feb. 19, 2023 (12 pages).
Office Action issued in Japanese Application No. 2021-572400, mailed Mar. 19, 2024 (8 pages).
Thibault, Charles, Communication in European Patent Application EP20715331.3, dated Sep. 26, 2024, 6 pages, pub. by the European Patent Office, Rijswijk, Netherlands.
Yang, Young June, Request for the Submission of an Opinion in Korean Patent Application No. KR1020227002891, mailed Apr. 1, 2025, 15 pages, pub. by the Korean Patent Office, Daejeon South Korea.

* cited by examiner

AUTOMATED STORAGE AND RETRIEVAL SYSTEM COMPRISING A BARRIER

FIELD OF THE INVENTION

The present invention relates to an automated storage and retrieval system for storage and retrieval of containers in a storage grid, in particular to an automated storage and retrieval system comprising a barrier physically preventing vehicles from moving between first and second sections of the storage grid.

BACKGROUND AND PRIOR ART

Figure 1:
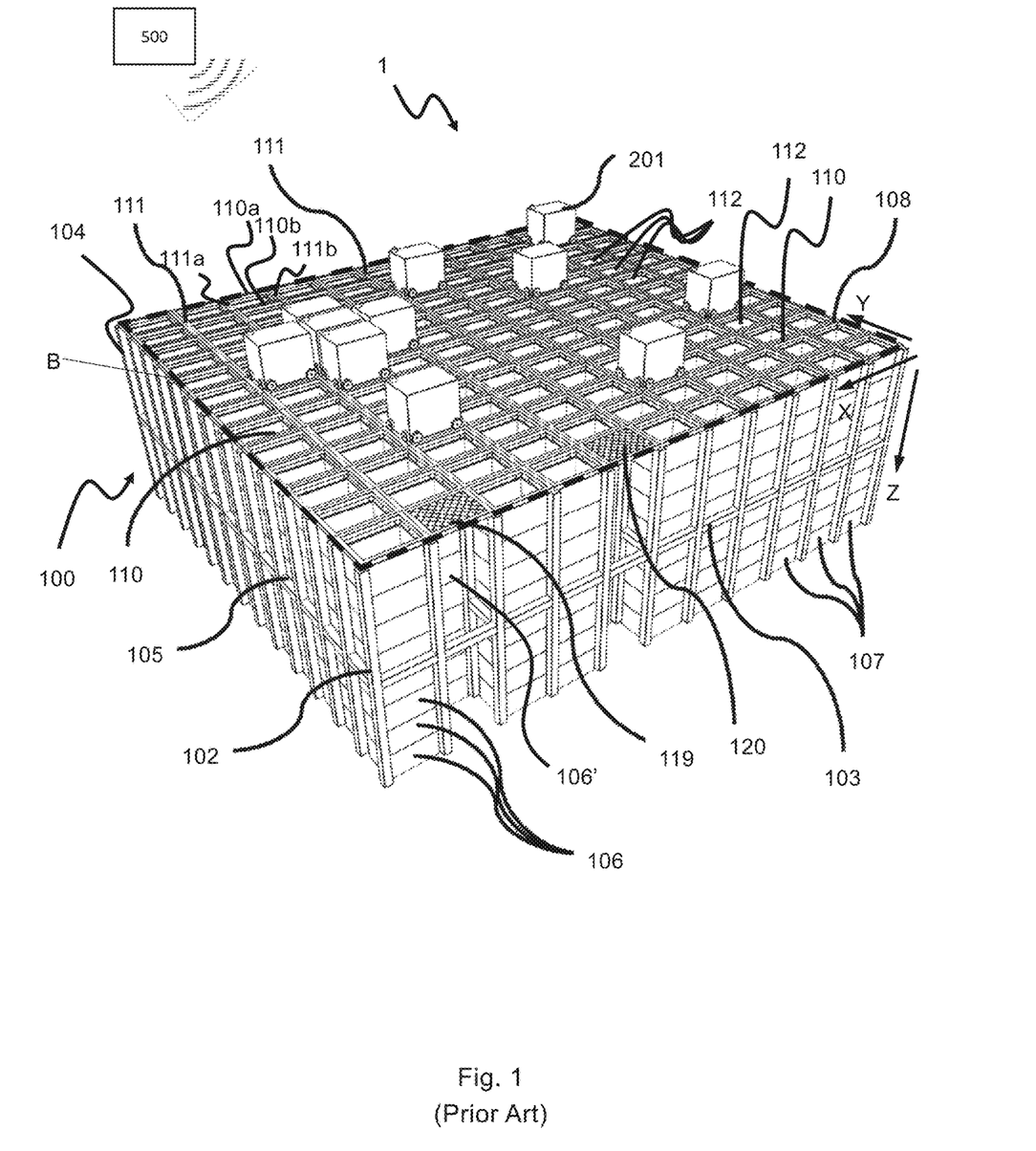
FIG. 1 is a perspective view of a framework structure of a prior art automated storage and retrieval system.
Figure 2:
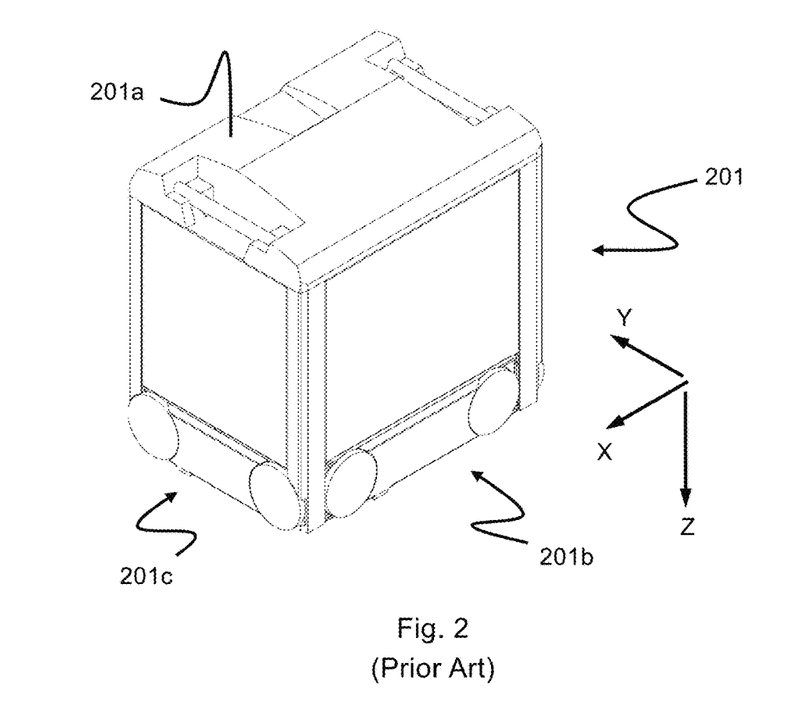
FIG. 2 is a perspective view of a prior art container handling vehicle having a centrally arranged cavity for carrying storage containers therein.
Figure 3:
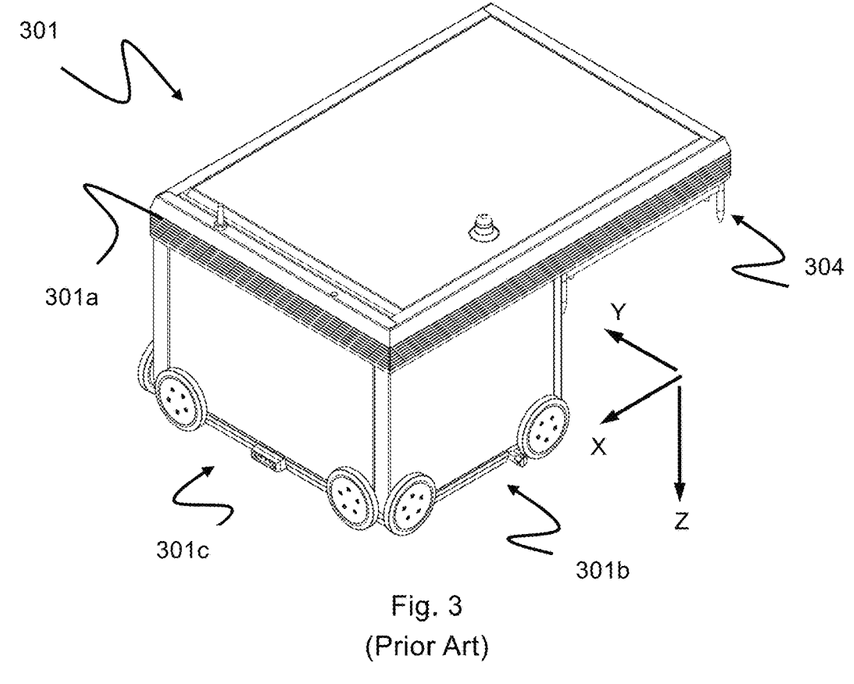
FIG. 3 is a perspective view of a prior art container handling vehicle having a cantilever for carrying storage containers underneath.

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 ... n and Y=1 ... n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

A problem associated with known automated storage and retrieval systems 1 is that it is challenging for personnel to access the rail system 108 for carrying out inspection, or to carry out maintenance of or to remove malfunctioning container handling vehicles.

Another important problem with maintenance or removal of malfunctioning vehicles is that a complete shutdown of the system 1 is needed for the personnel to access with low or zero risk of injury. In particular for large systems 1, for example systems 1 with excess of 500 vehicles in operation simultaneously, a complete shutdown is highly undesired due to significant cost for the operator.

One object of the present invention is to improve efficiency of the above type of automated storage and retrieval systems. Another object of the present invention is to improve safety during maintenance and repair operations and to improve efficiency during such maintenance and repair operations.

SUMMARY OF THE INVENTION

The present invention relates to an automated storage and retrieval system, comprising:

a three-dimensional storage grid for storing storage containers;

first and second container handling vehicles operating on the storage grid;

a central communication system for controlling and communicating with the container handling vehicles for handling storage containers in the storage grid;

characterized in that:

the automated storage and retrieval system comprises a barrier separating the three dimensional storage grid into a first section and a second section;

the barrier has two states: a first state in which the container handling vehicles are allowed to move between the first section and the second section; and a second state, in which the container handling vehicles are physically prevented from moving between the first section and the second section by means of the barrier.

Thus the present invention provides an automated storage and retrieval system that has the capability to split a working area of the storage grid into separated zones through deployment of the barrier and through the central communication system coordinating movements of the container handling vehicles. In this way, a safe environment on the storage grid can be provided for an operator to access a fault, where the safe environment is free of moving container handling vehicles.

In one aspect, the central communication system is configured to operate together with the barrier to provide a protective zone on the storage grid that is free of moving container handling vehicles to allow an operator to correct a fault condition in that protective zone.

In one aspect, the three-dimensional storage grid comprises a fence provided above the storage grid along a boundary thereof.

The term security zone here refers to a zone with predefined security and/or safety regulations, wherein some actions may be permitted in the protective zone while the same actions are not permitted in the other zone.

In one aspect, the system comprises an actuator for moving the barrier between its first and second states; wherein the central communication system is configured to control the actuator.

In one aspect, the central communication system is configured to:

detect if a fault condition is present in one of the first or second sections when the barrier is in the first state;

control all container handling vehicles that are functioning to move away from the section in which the fault condition is present;

control the actuator to move the barrier to its second state.

As all other container handling vehicles are moved away from the section in which the fault condition is present, it is now safe for personnel to correct the fault condition, as the other container handling vehicles are physically prevented from moving to or near the position of the fault condition.

In one aspect, when the fault condition has been corrected, the central communication system is configured to control the actuator to move the barrier to its first state again, and permit container handling vehicles to move into the section in which the fault condition was present. The central communication system also may be configured to control the container handling vehicles so that they enter the section where the fault was present previously.

Accordingly, during the period of repair and/or retrieval, the other vehicles may perform their normal operation in the section in which the fault condition was not present. Hence, efficiency is increased as some vehicles will be allowed to operate at all time, one exception being a situation where a fault condition is present in all sections at the same time.

In one aspect, the fault condition may be a malfunctioning vehicle. In one aspect, the fault condition may be a wrongly positioned storage container. In one aspect, the fault condition may be a wrongly positioned product item. In one aspect, the fault condition may be detected automatically and a signal indicating that a fault condition is present is sent automatically to the central communication system. The signal may comprise a position for the fault condition. The position may comprise the section of the storage grid in which the fault condition has been detected. Alternatively, a signal may be given manually by a person.

In one aspect, the sections are substantially of the same size.

In one aspect, the barrier defines a separation border between the first and second sections. In one aspect, the separation border is linear. In one aspect, the separation border is located between two rows of storage columns.

In one aspect, the barrier is movable from an initial position to a subsequent position when the barrier is in the first state, wherein the first and second sections in the initial position are different from the first and second sections in the new position.

Hence, should the fault condition be present at a border between the first section and the second section in the initial position, the fault condition may obstruct the barrier from moving to its second state. By moving the barrier itself to the new position, the fault condition is no longer an obstruction for the barrier.

According to the above, it is achieved that the separation border may be moved.

In one aspect, the actuator is sufficiently powerful to push a container handling vehicle into either the first section or into the second section when the barrier is moving from its first state to its second state.

In one aspect, the barrier is provided in a position above or below a vehicle travelling level in the first state and where wherein the barrier is provided in the vehicle travelling level in the second state.

In one aspect, the barrier comprises a rollable type of barrier, a foldable type of barrier, a sliding type of barrier, a linearly moving type of barrier or a pivotable type of barrier.

In one aspect, the system further comprises a walkway provided above the storage grid, wherein the barrier is suspended below the walkway.

In one aspect, the barrier is suspended from a different type of structure above the storage grid, for example the ceiling, a supporting beam for the ceiling etc. of the building in which the storage grid is located.

In one aspect, the storage grid comprises one continuous framework structure comprising upright members and horizontal members, wherein the storage containers are stored in storage columns provided between the members; wherein the one continuous framework structure comprises rails for guiding the vehicles during their operation on the storage grid and during their movement between the first section and the second section.

In one aspect, the barrier may comprise a physical barrier in the form of vehicle stopping elements provided below the vehicle travelling level in the first state, wherein the posts are elevated to the vehicle travelling level in the second state.

The vehicle stopping elements may comprise posts, bars etc.

In one aspect, the vehicle stopping elements are linearly movable by means of a linear actuator. In one aspect, the vehicle stopping posts are pivotably movable by means of a rotating actuator.

In one aspect, the barrier is movably connected to the upright members or the horizontal members, wherein the barrier is located vertically below the rails in the first state.

In one aspect, the container handling vehicle comprises a vehicle communication system with a vehicle transmitter and a vehicle receiver for communication with the central communication system and/or other container handling vehicles.

In one aspect, the vehicle transmitter and vehicle receiver of the vehicle communication system are configured to communicate instructions to open or close the barrier.

In one aspect, the system and vehicle transmitters and receivers are configured to use light for wireless communication, and wherein the system transmitter and the system receiver are located in the automated storage system on, around or under the storage grid.

The present invention also relates to a method for correcting a fault condition in an automated storage and retrieval system, wherein the automated storage and retrieval system comprises a three-dimensional grid for storing storage containers, first and second container handling vehicles operating on the storage grid, and a central communication system with a system transmitter and a system receiver for controlling and communicating with the at least one container handling vehicle;
characterized in that the method comprises:
defining the three-dimensional storage grid with a first section and a second section separate from the first section;
controlling a barrier of the automated storage and retrieval system between two states: a first state in which the container handling vehicles are allowed to move between the first section and the second section; and a second state, in which the container handling vehicles are physically prevented from moving between the first section and the second section by means of the barrier.

In one aspect, the method further comprises:
detecting, when the barrier is in its first state, if a fault condition is present in one of the first or second sections;
controlling all container handling vehicles that are functioning to move away from the section in which the fault condition is present;
controlling the barrier to be in its second state.

In one aspect, the method comprises the steps of:
moving the barrier from an initial position to a subsequent position when the barrier is in the first state, wherein the first and second sections in the initial position are different from the first and second sections in the new position.

In one aspect, the method comprises the step of:
pushing a container handling vehicle into either the first section or into the second section by means of the barrier.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 with rails 110, 111 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 4:
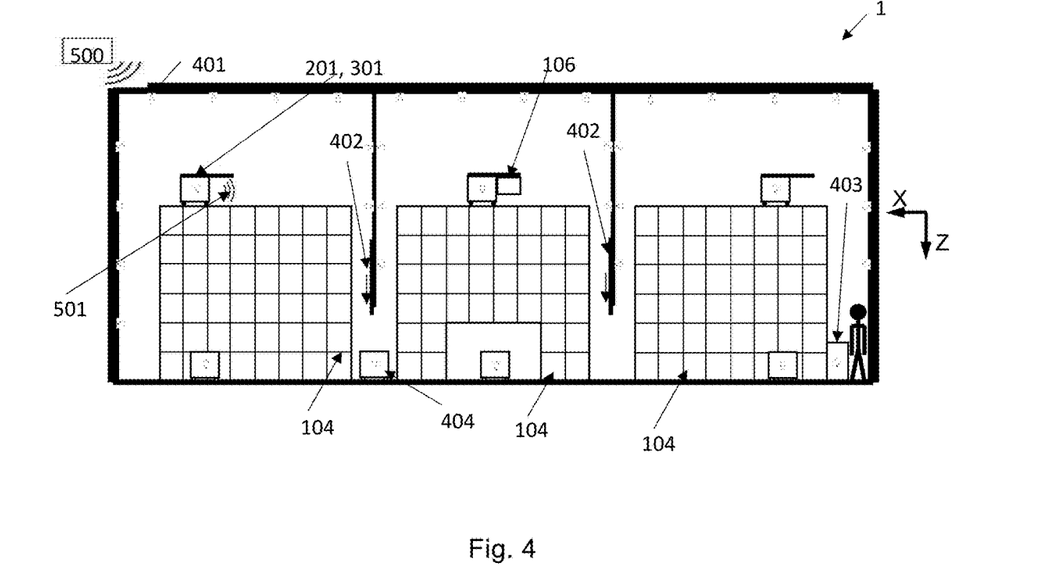
FIG. 4 illustrates schematically a side view of three separate storage grids.

FIG. 4 is a side view of an embodiment wherein a central communication system 500 uses light as a medium for communication in the storage system 1.

The storage system 1 is comprised of at least one container handling vehicle 201, 301, 404 for transporting containers 106. These container handling vehicles 201, 301, 404 can be vehicles 201, 301, moving on top of the storage grid 104 lifting containers 106 out of the grid 104, but also remotely operated delivery vehicles 404 for transport of a storage container 106 between the storage grid 104 and e.g. a port 403 for handling of the storage containers 106. The system 1 further comprises a central communication system 500 for communicating information to all parts of the system 1. The system 1 can also comprise at least one port 403 which the containers are transported to and where the relevant articles are picked out of the containers for shipping. After the relevant articles has been picked out, the containers 106 are sent back to a container handling vehicle 201, 301, 404 for transportation back into the storage grid 104. Further, the system 1 may comprise one or more barriers 402 separating sections of the storage grid 104. The system 1 may also comprise other parts.

In a preferred embodiment of the present invention the central communication system 500 communicates information to the different parts of the storage system 1 via a plurality of transmitters 401. These transmitters 401 use light as a medium for communication. The transmitters 401 are positioned around the storage grid 104 in the facilities housing the storage system 1, ensuring that all areas of the storage system 1 are in line of sight of at least one transmitter 401.

The transmitters 401 can be in the form of LED lamps for transmitting information. Cameras can be used for receiving information. However, any other form of equipment for transmitting and receiving information using light as a medium for communication can be used.

In the solution presented in the present invention where light is used as a medium of communication, it is essential that the transmitter 401 and the receiver are in line of sight of each other. In a large storage facility, it may therefore be necessary to use several transmitters 401 and receivers distributed in the facilities housing the storage system 1 in order to cover all the areas of the storage system 1.

If all transmitters and receivers of a container handling vehicle are unable to communicate via light signals, that container handling vehicle automatically manoeuvres to a service station. Alternatively, the container handling vehicles 201, 301, 404 can have a backup communication system. This backup communication system can be Wi-Fi. If the communication system, using light as a medium for communication, for some reason breaks down the Wi-Fi system can take over the communication with the central communication system 500.

In yet another alternative solution the communication between the central communication system 500 and the rest of the storage system 1 can be by using both light and Wi-Fi as communication channels. Light as a medium for communication can be used for communication from the central communication system 500 to the vehicle, ports and barriers and Wi-Fi from the vehicles, ports and barriers to the central communication system 500.

In order to prevent light interference, the storage system 1 can be divided into sections. These sections can be separated by light blocking dividers. These dividers can be curtains, screens or barriers that can be raised or lowered when needed. This makes it possible to separate the communication in one section from the rest of the sections. One such section can be one grid separated from other grids or one part of the grid separated from the rest of the grid. A storage grid can be separated into several such sections.

A benefit with this is that it makes it easier to do maintenance on a container handling vehicle on the grid. Further, these sections can be protective zones in case of fire. A further benefit with using light as a means for communication is that it is safer when there is a need for an emergency stop on the entire storage system. Since Wi-Fi is susceptible to interference from signals outside the storage system 1, there is a chance that interference can cause the container handling vehicles to do unintended operations. Using light as a means for communication in a storage system 1 that is blocked off from light interference from the outside, the chance of unintended operations of container handling vehicles is reduced to almost nothing.

Further, by separating the storage grid into sections that can be blocked off from communication from outside the section it makes it easier to ensure that the container handling vehicles in a certain section is shut down, or alternatively that the container handling vehicles in a section are operational while the rest of the storage system 1 is shut down.

Figure 5:
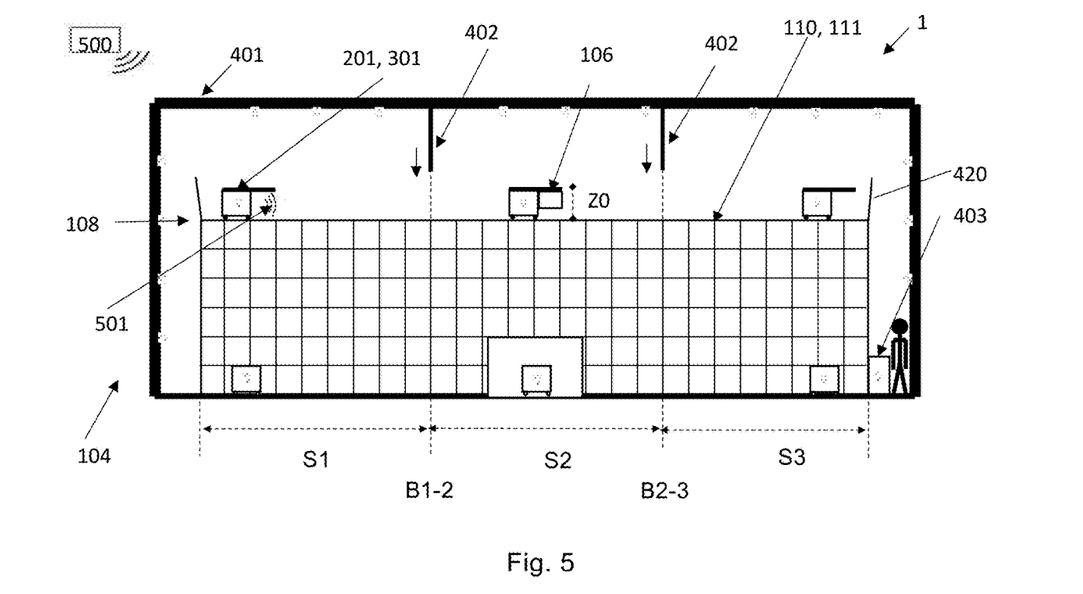
FIG. 5 illustrates schematically a side view of one storage grid separated into three sections.

FIG. 5 shows an embodiment of the present invention. Here, other types of communication can be used as an alternative to the light used as a medium used in FIG. 4. Hence, electromagnetic communication such as radio-based communication can be used. Several types of such electromagnetic communication are commonly used in storage systems today, and will not be discussed further in detail herein.

The central communication system 500 is connected to, or integrated with, the control system for operating the automated storage and retrieval system 1. Hence, the central communication system and the control system are commonly referred to as reference number 500 in the drawings.

In FIG. 5, there is one large three-dimensional grid 104, separated into first, second and third sections S1, S2, S3. A first border B1-2 separates the first and second sections S1, S2. A second border B2-3 separates the second and third sections S2, S3.

There is one common rail system 108 with rails 110, 111 for the top level of the storage grid 104 for guiding the vehicles 201, 301 during their operation on the storage grid 104 and during their movement between the sections S1, S2, S3.

The automated storage and retrieval system 1 of FIG. 5 comprises two barriers 402. The barriers 402 have two states: a first state in which the container handling vehicles 201, 301 are allowed to move between the sections S1, S2, S3; and a second state, in which the container handling vehicles 201, 301 are physically prevented from moving between the sections S2, S2, S3 by means of the barrier 402. It should be noted that the barriers 402 may be controlled independently.

Hence, if the left barrier is in the second state and the right barrier is in the first state, vehicles may move between the second and third sections S2, S3, but not between the first and second sections S1, S2.

Hence, when all barriers 402 are in the first state, the container handling vehicles 201, 301 may operate on the entire grid 104 as if no sections were defined at all.

However, when the barriers 402 are in the second state, the first section S1 provides a first protective zone, the second section S2 provides a second protective zone and the third section S3 provides a third protective zone, all protective zones being separate from each other. Hence, some actions may be permitted in one protective zone while the same actions are not permitted in other protective zones.

The system 1 further comprises an actuator M for moving the barrier(s) 402 between its first and second states. Preferably, the central communication system 500 is configured to control the actuator M. The actuator M can be an electric motor, an electric and/or hydraulic actuator etc. and is considered known for a person skilled in the art.

Figure 6:
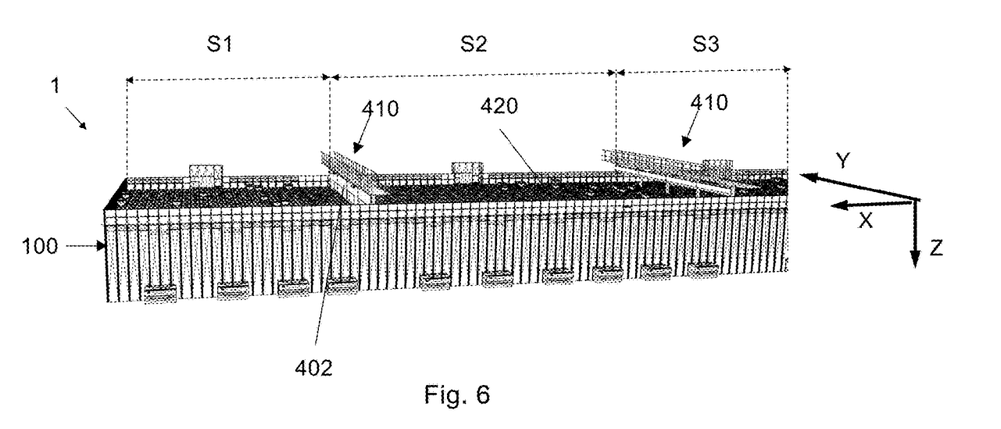
FIG. 6 illustrates a first embodiment of the storage grid with a first type of barrier device.
Figure 7:
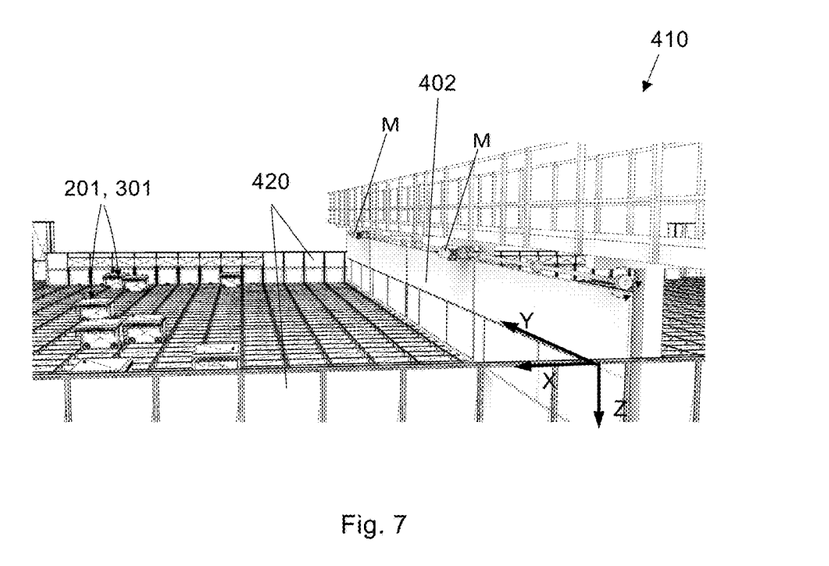
FIG. 7 illustrates an enlarged view of the first type of barrier device shown in FIG. 6.
Figure 12A:
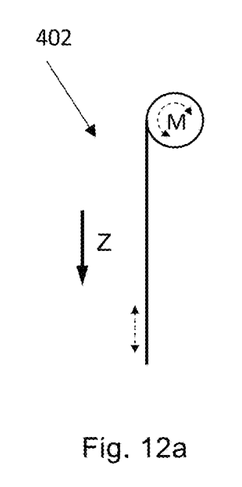
FIG. 12a illustrates a vertically movable barrier device in the form of a rollable curtain being made of a reinforced fabric or a fabric containing reinforcing elements.

In FIGS. 5, 6 and 7, the barrier 402 is a rollable type of barrier, in the form of a curtain, similar to the separation wall commonly used in sport halls to separate the hall into smaller hall sections. This type of rollable barrier is also illustrated in FIG. 12a. The curtain can be made of a reinforced fabric or a fabric containing reinforcing elements.

Figure 12B:
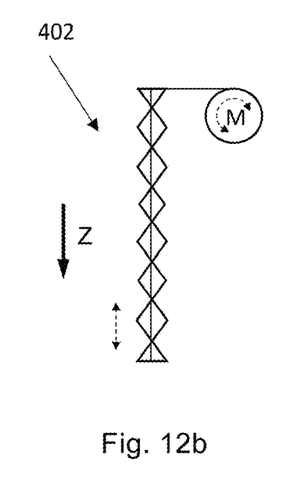
FIG. 12b illustrates a vertically movable barrier device similar to a venetian blind or pleated blind.
Figure 12C:
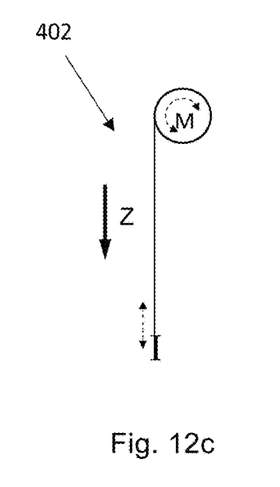
FIG. 12c illustrates a vertically movable barrier device in the form of a I-beam suspended in wires.

One alternative is shown in FIG. 12b, which illustrates a vertically movable barrier device similar to a venetian blind or pleated blind. Another alternative is shown in FIG. 12c, where the barrier comprises a beam, such as an I-beam or H-beam suspended by means of wires.

In FIG. 5 it is shown that the vehicles are moving in a vehicle travelling level Z0 indicating the height of the vehicles. The above barriers 402 are suspended above the vehicle traveling level Zo in the first state. In the second state, the barrier is moved to this vehicle traveling level Z0 to physically prevent vehicles from moving between sections S1, S2, S3.

In FIGS. 6 and 7, the barrier 402 is suspended below a walkway 410, the walkway being for use as a shortcut for people walking from one side of the grid to the opposite side of the grid. Alternatively, the barrier 402 may suspended from a different type of structure above the storage grid, for example the ceiling, a supporting beam for the ceiling etc. of the building in which the storage grid is located.

Figure 12D:
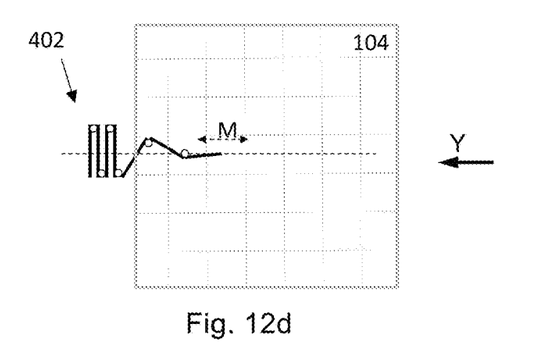
FIG. 12d illustrates a horizontally movable hinged panel wall.

In FIG. 12d, an alternative barrier 402 in the form of a horizontally movable hinged panel wall is shown. Here, the barrier 402 will be provided to the side of the vehicle traveling area Z0 in the first state and will be slid or in other ways moved sideways into the vehicle traveling area Z0 in the second state.

Figure 12E:
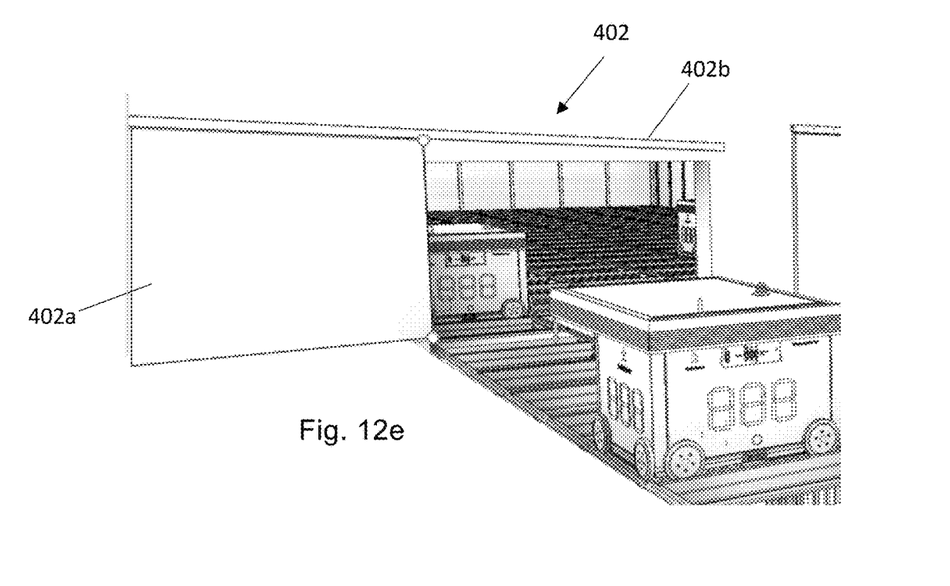
FIG. 12e illustrates a horizontally slidable panel wall.

In FIG. 12e, an alternative barrier 402 in the form of a horizontal slidable panel wall 402a is shown. The slidable panel wall 402a slidably engaged with, and suspended from, a rail 403b above the grid structure. The slidable panel wall 402a may also be slidably engaged with the rails 110, 111 used by the container handling vehicles. There can be a number of such panel walls adjacent to each other along the border between two regions S1, S2.

Figure 8A:
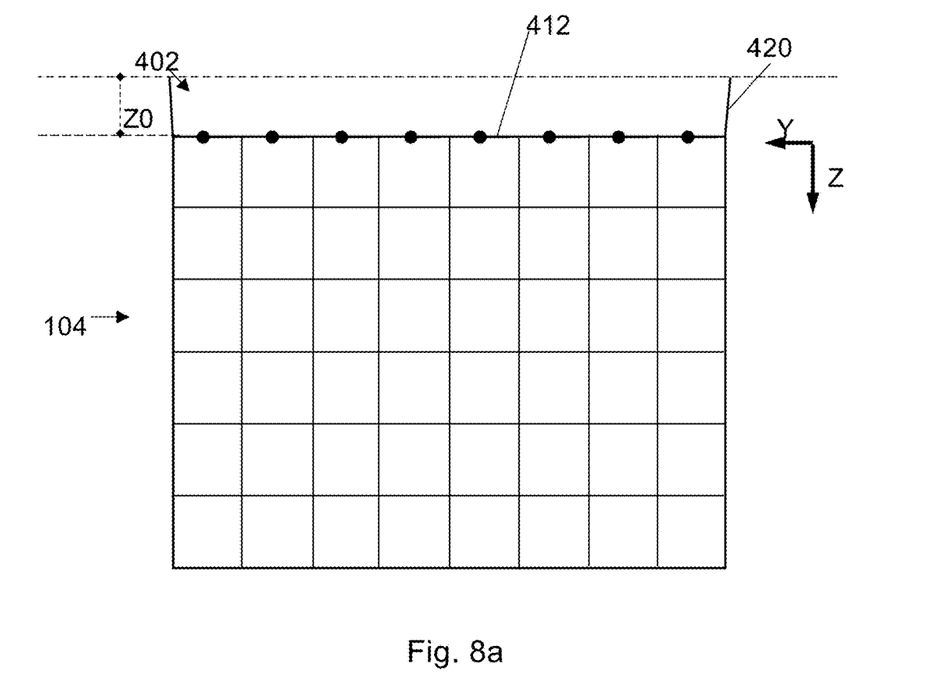
FIGS. 8a and 8b illustrate the first and second states of a pivotally moving type of barrier device connected to the framework structure of the storage grid.
Figure 8B:
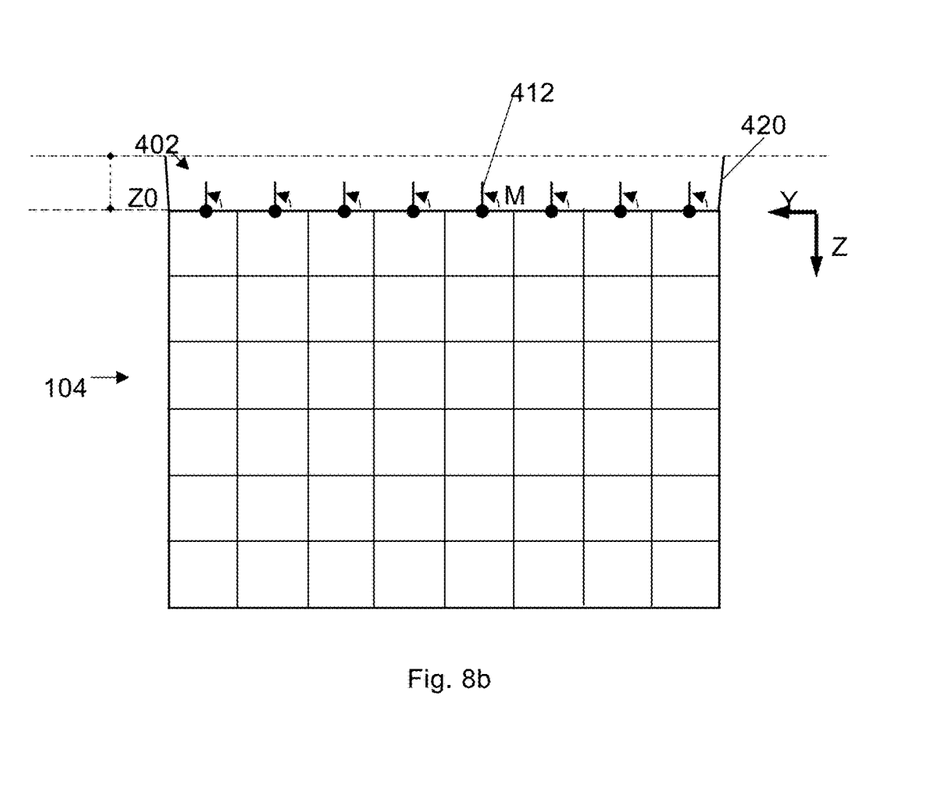

It is now referred to FIGS. 8a and 8b. Here, the barrier 402 comprises a number of pivotable vehicle stopping elements 412 which are provided below the vehicle traveling area Z0 in the first state and which are pivoted up into the vehicle traveling area Z0 in the second state.

Figure 9A:
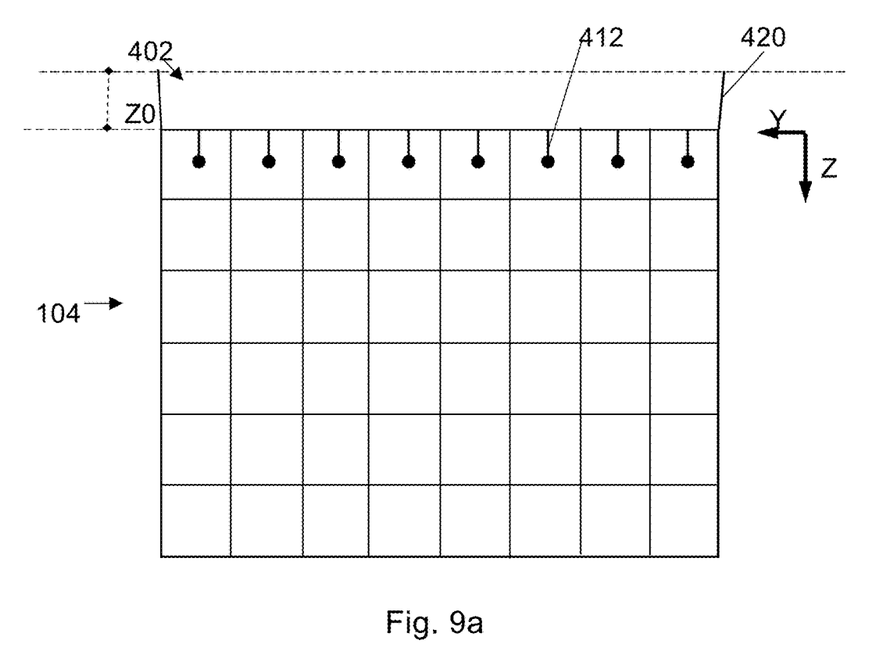
FIGS. 9a and 9b illustrate the first and second states of a linearly moving type of barrier device connected to the framework structure of the storage grid.
Figure 9B:
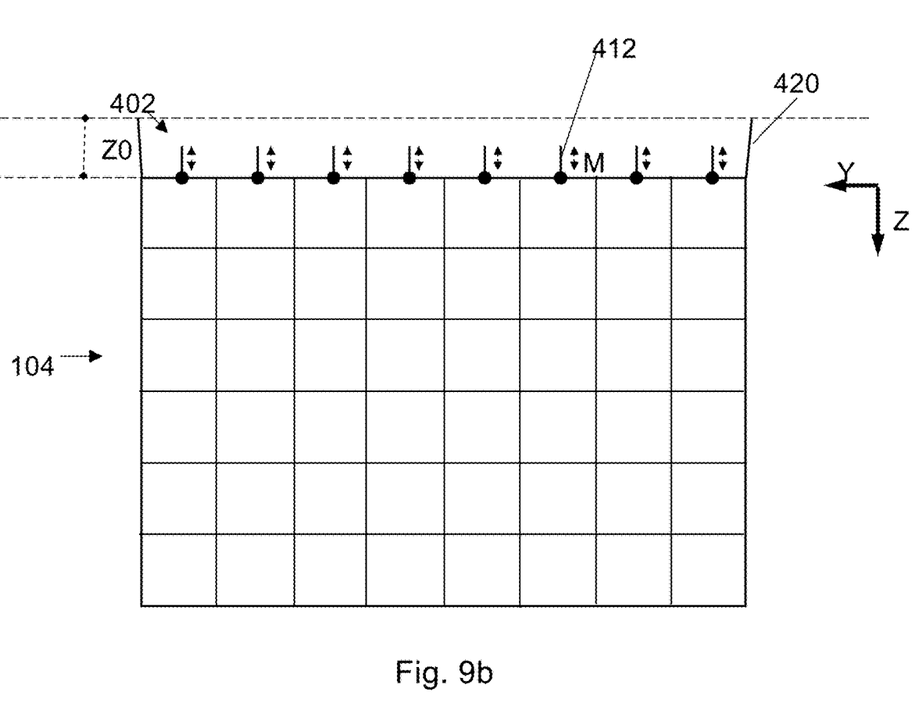

It is now referred to FIGS. 9a and 9b. Here, the barrier 402 comprise a number of linearly moving vehicle stopping elements 412 which are provided below the vehicle traveling area Z0 in the first state and which are displaced vertically up into the vehicle traveling area Z0 in the second state.

The above vehicle stopping elements 412 does not need to be as high as the vehicles or vehicle traveling area Z0, as long as they are sufficiently high and robust to physically prevent the vehicles from moving between two sections. The vehicle stopping elements 412 may comprise posts, bars etc.

The above vehicle stopping elements 412 are provided along the first and/or second border B1-2, B2-3 between the sections S1, S2, S3. Typically, there will be one vehicle stopping element 412 for each storage column 105.

Figure 13A:
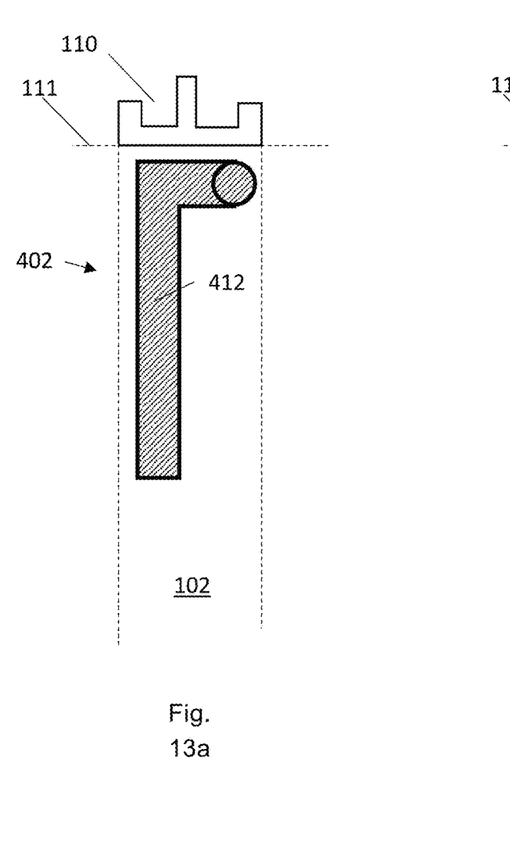
Figure 13B:
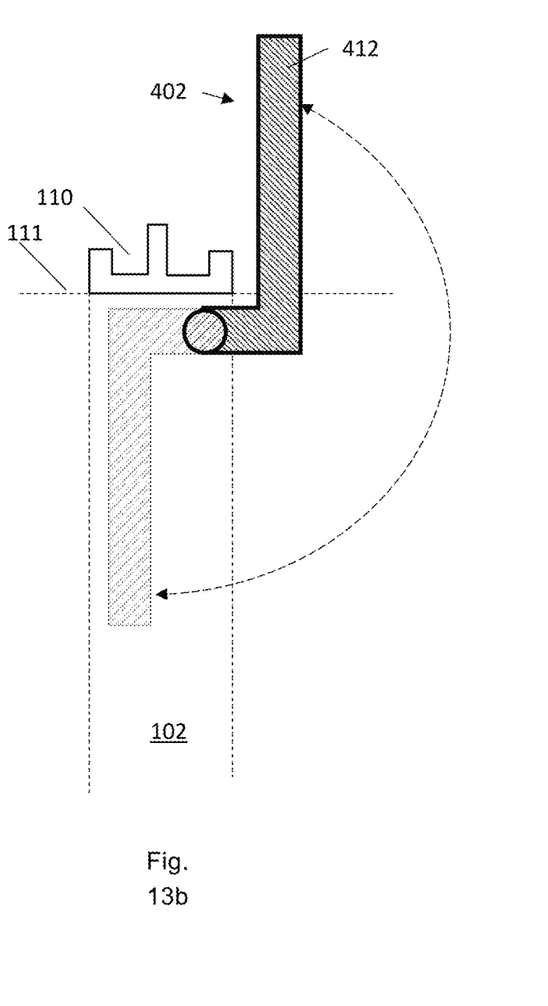

It is now referred to FIGS. 13a and 13b. Here, an alternative vehicle stopping element 412 is shown pivotably connected to the upright members 102 of the framework structure 100. The vehicle stopping element is here L-shaped, which makes it possible to provide the element vertically below the rails 110, 111 in the first state and still enable the vehicle stopping element to be pivoted up and into the vehicle traveling level Z0.

In this way, the barrier 402 may be retrofitted to an existing storage grid 104, and hence the storage grid may have the same number of columns without any horizontal extension of the storage grid.

Operation

The operation of the barrier 402 will be described further in detail below.

The barriers 402 will be used if a fault condition is present in one of the sections S1, S2, S3. The central communication system 500 will then control all container handling vehicles 201, 301 that are functioning to move away from the section in which the fault condition is present, and then control the actuator M to move the barrier 402 to its second state in order to isolate the fault condition to one of the sections.

As all other container handling vehicles 201, 301 are moved away from the section in which the fault condition is present, it is now safe for personnel to correct the fault condition, as the other container handling vehicles are physically prevented from moving to or near the position of the fault condition.

When the fault condition has been corrected, the central communication system 500 is configured to control the actuator M to move the barrier 402 to its first state again, and permit container handling vehicles 201, 301 to move into the section S1, S2 in which the fault condition was present.

Accordingly, during the period of repair and/or retrieval, the other vehicles may perform their normal operation in the section or sections in which the fault condition was not present. Hence, efficiency is increased as some vehicles will be allowed to operate at all time, one exception being a situation wherein a fault condition is present in all sections at the same time.

Some further examples will be given below.

Example 1

In this example, the fault condition is a malfunctioning vehicle which cannot move by itself to a service station. The malfunctioning vehicle has stopped in the first section S1. Consequently, this malfunctioning vehicle must be retrieved from the grid to a service station and/or must be repaired on grid, often requiring a person to move onto the grid by means of a service vehicle. The service vehicle may provide sufficient protection from moving vehicles adjacent to the service vehicle. However, often there will be a need for the person to stick his/her's arms out to reach the malfunctioning vehicle, or to leave the service vehicle and stand on top of the storage grid during the repair/retrieval. Hence, there is a potential risk of injuries caused by an adjacent moving vehicle.

According to the present invention, this can be avoided as all container handling vehicles 201, 301 except the malfunctioning one are moved away from the section S1 in which the fault condition is present. Of course, it is possible to use the central communication system 500 to instruct the functioning vehicles to stay a predetermined distance away from the malfunctioning vehicle, or to instruct the functioning vehicles to operate only in the second and/or third sections S2, S3. However, for the person performing the service operation on the malfunctioning vehicle, the barrier 402 will represent an additional safety, as the barrier will physically prevent vehicles from operating close to the malfunctioning vehicle.

Example 2

In this example, the fault condition is a wrongly positioned storage container, i.e. a storage container being in a position in which the container handling vehicle cannot connect to the storage container. The storage container will here form an obstruction for storage containers below the wrongly positioned storage container and/or form an obstruction for the movement of container handling vehicles.

In similar way as the first example, also here a person is required to move onto the grid, for example by means of a service vehicle.

Example 3

In this example, the fault condition is a wrongly positioned product item, i.e. a product item which has fallen out from a storage container and is now in a position in which the container handling vehicle cannot connect to a storage container, a position in which storage containers cannot be stacked above each other or a position which forms an obstruction for movement of container handling vehicles.

Again, also here a person will be required to move onto the grid, for example by means of a service vehicle.

In the above examples, the detection of a fault condition may be detected automatically, for example by means of cameras detecting a non-moving vehicle, an error signal sent from a malfunctional vehicle, a camera detecting a storage container in a suspicious position, or a fallen item that is blocking a vehicle path, etc. The detection of a fault condition may also be given manually by a person, for example a person pushing a button (such as an emergency button close to the grid, a button on a user interface etc.) based on an observation of a fault condition. The person will typically then push a button indicating the section in which the fault condition is present.

In FIGS. 5, 6 and 7, it is shown that the three-dimensional storage grid 104 comprises a fence 420 provided above the storage grid 104 along a boundary B (indicated as a dashed line B in FIG. 1) thereof. By means of the fence 420 people can be prevented from accessing the first section of the storage grid 104, i.e. preventing collisions between people and the container handling vehicles operating on the storage grid 104, or preventing people from getting injured by falling into a storage column of the storage grid. In addition, the fence 420 physically prevents container handling vehicles from moving beyond the boundary B of the storage grid 104. The fence 420, together with the barrier 402 in its second state, separate the regions S1, S2 of the storage grid 104 into enclosed security zones or protective zones.

Example 4

Figure 10A:
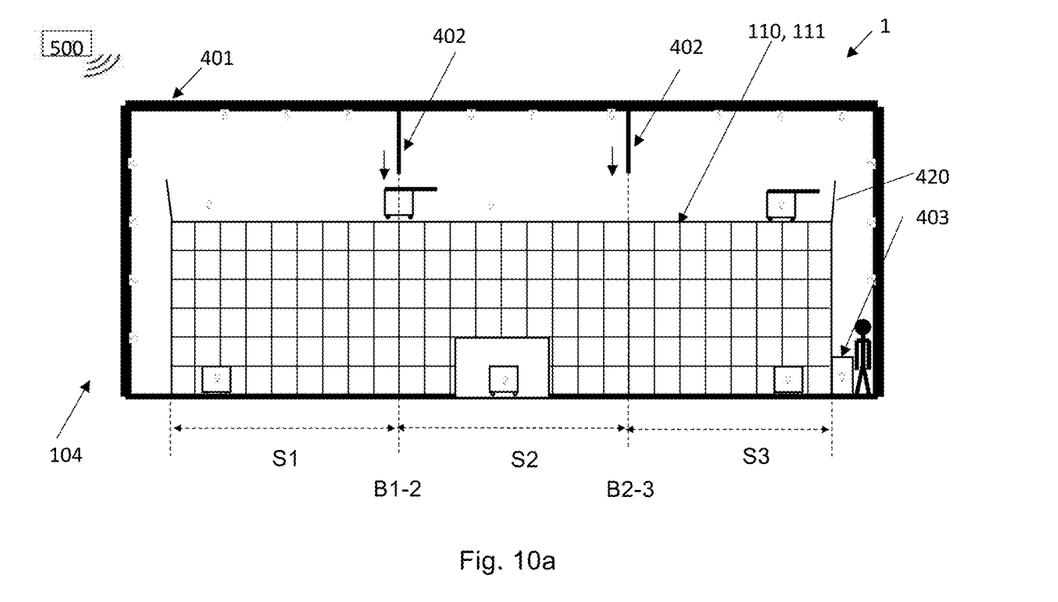
FIGS. 10a and 10b illustrate the first and second states of a horizontally moving barrier.

It is now referred to FIG. 10a. Here, the fault condition in the form of a malfunctioning vehicle has been detected on the border B1-2 between the first and second sections S1, S2. Hence, the fault condition itself may obstruct the barrier 402 from getting to the second state.

Figure 10B:
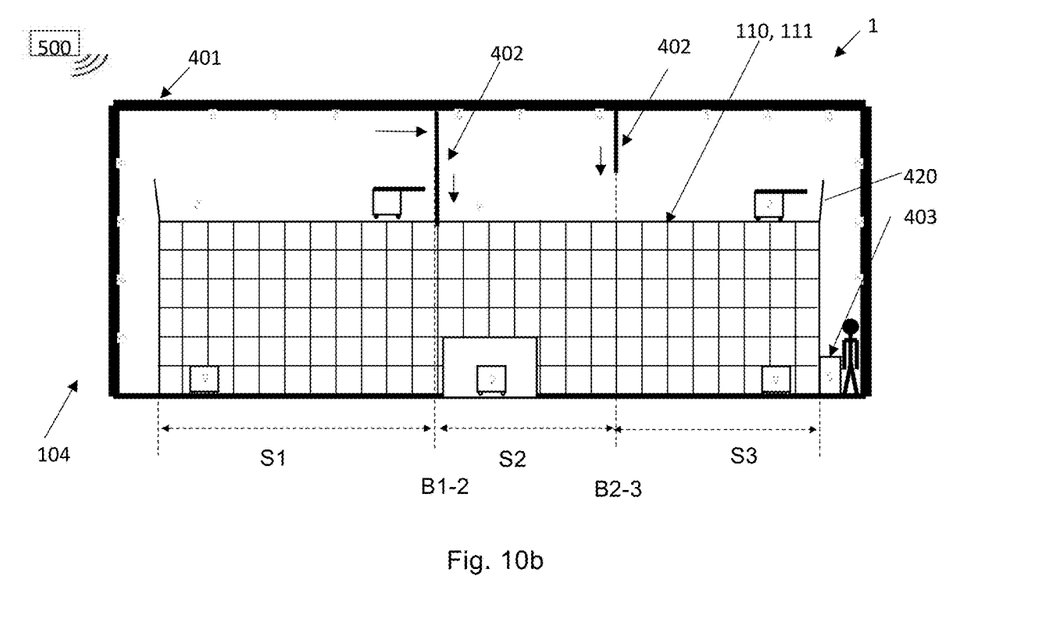

In this example, the barrier 402 is movable from an initial position shown in FIG. 10a to a subsequent position shown in FIG. 10b when the barrier is in the first state. Then, the barrier 402 is brought to the second state. In the subsequent position, the fault condition is no longer obstructing the barrier from moving to the second state. It should be noted that the first and second sections S1, S2 in the initial position are different from the first and second sections S1, S2 in the new position.

According to the above, it is achieved that the separation border B1-2 may be moved.

Example 5

Figure 11A:
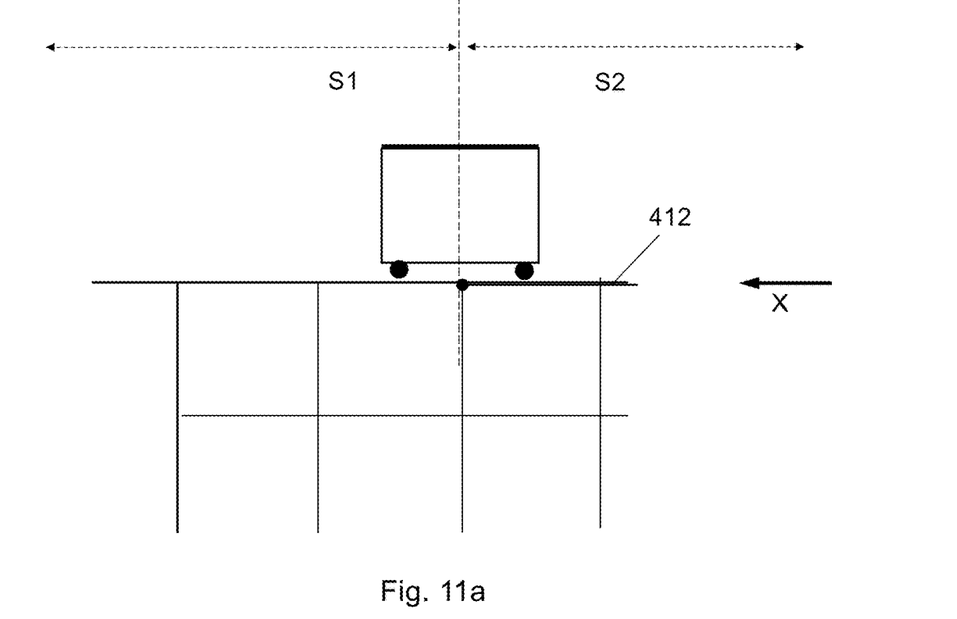
FIGS. 11a and 11b illustrate the first and second states of an upwardly pivoting barrier.

It is now referred to FIG. 11a, showing a similar situation as in example 4, where the fault condition is a malfunctioning vehicle present on the border B1-2 between the first and second sections S1, S2. Here, the barrier 402 is of the type shown in FIGS. 8a and 8b, i.e. a pivoting type of barrier provided below the vehicle travelling level Z0 in the first state.

Figure 11B:
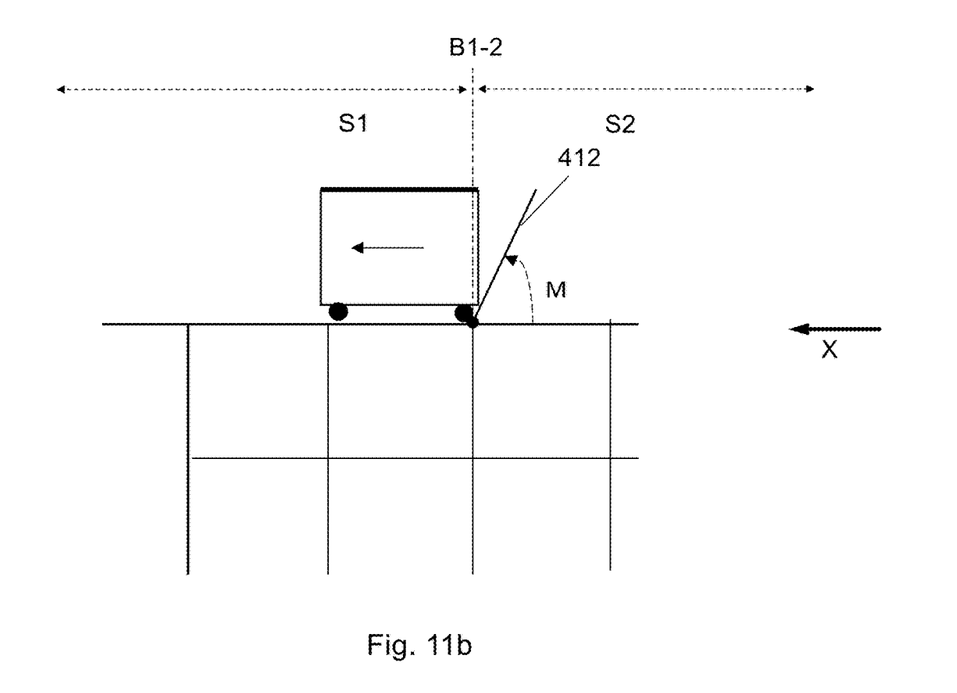

The actuator M of the barrier 402 is here sufficiently powerful to push a container handling vehicle 201, 301 into the first section S1 when the barrier 402 is moving from its first state to its second state. If the actuator M is sufficiently powerful to push a vehicle, then the actuator will be able to push a storage container away from the border B1-2.

In the preceding description, various aspects of the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-4)

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
401 System transmitter
402 Barrier
410 Walkway
420 Fence
500 Control system
X First direction Y Second direction
Z Third direction
M Actuator
B Boundary

The invention claimed is:

1. An automated storage and retrieval system, comprising:
a three-dimensional storage grid for storing storage containers;
first and second container handling vehicles operating on the storage grid;
a central communication system for controlling and communicating with the container handling vehicles for handling storage containers in the storage grid;
wherein the automated storage and retrieval system comprises a barrier separating the three dimensional storage grid into a first section and a second section,
wherein the barrier has two states:
a first state in which the container handling vehicles are allowed to move between the first section and the second section; and
a second state, in which the container handling vehicles are physically prevented from moving between the first section and the second section by means of the barrier,
wherein the system also comprises an actuator for moving the barrier between the first and second states;
wherein the central communication system is configured to control the actuator; and
wherein the actuator is sufficiently powerful to push a container handling vehicle into either the first section or into the second section when the barrier is moving from the first state to the second state.

2. The automated storage and retrieval system according to claim 1, wherein the central communication system is configured to operate together with the barrier to provide a protective zone on the storage grid that is free of moving container handling vehicles to allow an operator to correct a fault condition in that protective zone.

3. The automated storage and retrieval system according to claim 1, wherein the three-dimensional storage grid comprises a fence provided above the storage grid along a boundary thereof.

4. The automated storage and retrieval system according to claim 1, wherein the central communication system is configured to:
detect if a fault condition is present in one of the first or second sections when the barrier is in the first state;
control all container handling vehicles that are functioning to move away from the section in which the fault condition is present; and
control the actuator to move the barrier to the second state.

5. The automated storage and retrieval system according to claim 1, wherein the sections are substantially of the same size.

6. The automated storage and retrieval system according to claim 1, wherein the barrier is movable from an initial position to a subsequent position when the barrier is in the first state, wherein the first and second sections in the initial position are different from the first and second sections in the subsequent position.

7. The automated storage and retrieval system according to claim 1, wherein the system further comprises a walkway provided above the storage grid, wherein the barrier is suspended below the walkway.

8. The automated storage and retrieval system according to claim 1, wherein the storage grid comprises one continuous framework structure comprising upright members and horizontal members, wherein the storage containers are stored in storage columns provided between the members; wherein the one continuous framework structure comprises rails for guiding the vehicles during their operation on the storage grid and during their movement between the first section and the second section.

9. The automated storage and retrieval system according to claim 8, wherein the barrier is movably connected to the upright members or the horizontal members and wherein the barrier is located vertically below the rails in the first state.

10. A method for correcting a fault condition in an automated storage and retrieval system, wherein the automated storage and retrieval system comprises a three-dimensional grid for storing storage containers, first and second container handling vehicles operating on the storage grid, and a central communication system with a system transmitter and a system receiver for controlling and communicating with the first and second container handling vehicles;
the method comprising:
defining the three dimensional storage grid with a first section and a second section separate from the first section;
controlling a barrier of the automated storage and retrieval system between two states: a first state in which the first and second container handling vehicles are allowed to move between the first section and the second section; and a second state, in which the first and second container handling vehicles are physically prevented from moving between the first section and the second section by means of the barrier; and
pushing a particular container handling vehicle from among the first and second container handling vehicles into either the first section or into the second section by means of the barrier.

11. The method according to claim 10, wherein the method further comprises:
detecting, when the barrier is in its first state, if a fault condition is present in one of the first or second sections;
controlling all container handling vehicles that are functioning to move away from the section in which the fault condition is present; and
controlling the barrier to be in the second state.

12. The method according to claim 10, wherein the method further comprises:
moving the barrier from an initial position to a subsequent position when the barrier is in the first state, wherein the first and second sections in the initial position are different from the first and second sections in the subsequent position.

* * * * *